(12) United States Patent
Hayashi et al.

(10) Patent No.: US 8,288,024 B2
(45) Date of Patent: Oct. 16, 2012

(54) POWER SUPPLY PACK STRUCTURE

(75) Inventors: Tsuyoshi Hayashi, Nishikamo-gun (JP); Hiroharu Kawasaki, Miyaki-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 321 days.

(21) Appl. No.: 11/886,882

(22) PCT Filed: Aug. 7, 2006

(86) PCT No.: PCT/JP2006/315984
§ 371 (c)(1),
(2), (4) Date: Sep. 21, 2007

(87) PCT Pub. No.: WO2007/018303
PCT Pub. Date: Feb. 15, 2007

(65) Prior Publication Data
US 2009/0017368 A1    Jan. 15, 2009

(30) Foreign Application Priority Data
Aug. 8, 2005 (JP) .................................. 2005-229596

(51) Int. Cl.
*H01M 2/00* (2006.01)
(52) U.S. Cl. ............................................. 429/1; 429/65
(58) Field of Classification Search .................. None
See application file for complete search history.

(56) References Cited

U.S. PATENT DOCUMENTS

| | | |
|---|---|---|
| 5,404,090 A | 4/1995 | Shinbori |
| 6,152,776 A | 11/2000 | Ikeda et al. |
| 6,346,011 B1 | 2/2002 | Ikeda |
| 6,544,077 B2 | 4/2003 | Ikeda |
| 6,645,666 B1 | 11/2003 | Moores, Jr. et al. |
| 6,935,020 B2 | 8/2005 | Ikeda |
| 2002/0084188 A1* | 7/2002 | Tran et al. ...................... 204/551 |
| 2006/0110656 A1* | 5/2006 | Moores et al. .................. 429/83 |

(Continued)

FOREIGN PATENT DOCUMENTS

GB    1393305    *    5/1975

(Continued)

OTHER PUBLICATIONS

Sep. 6, 2011 Office Action issued in Japanese Patent Application No. 2005-229596 (with translation).

*Primary Examiner* — Melvin C Mayes
*Assistant Examiner* — Sheng H Davis
(74) *Attorney, Agent, or Firm* — Oliff & Berridge, PLC (57) ABSTRACT

A power supply pack structure includes a battery set having a positive terminal and a negative terminal, a battery case housing the battery set, a total positive cable having both ends connected to the positive terminal and an apparatus, respectively, and a total negative cable having both ends connected to the negative terminal and the apparatus, respectively. The battery case has an opening formed therein for accessing the apparatus. In the state where the apparatus is not disposed in the battery case, at least one of a condition that length L1 of the total positive cable is shorter than the shortest distance between the positive terminal and the opening and a condition that length L2 of the total negative cable is shorter than the shortest distance between the negative terminal and the opening is satisfied. This configuration provides a power supply pack structure that prevents the cable from being accidentally touched.

9 Claims, 5 Drawing Sheets

U.S. PATENT DOCUMENTS

2009/0017368 A1 1/2009 Hayashi et al.

FOREIGN PATENT DOCUMENTS

| JP | A-5-146078 | 6/1993 |
|---|---|---|
| JP | A-7-122249 | 5/1995 |
| JP | A-11-120987 | 4/1999 |
| JP | A 2001-006643 | 1/2001 |
| JP | A 2002-175791 | 6/2002 |
| JP | A 2003-168487 | 6/2003 |
| JP | A 2003-341373 | 12/2003 |
| JP | B2 3485162 | 1/2004 |
| WO | WO 2007/018303 A1 | 2/2007 |

* cited by examiner

POWER SUPPLY PACK STRUCTURE

TECHNICAL FIELD

The present invention generally relates to a power supply pack structure, and more particularly to a power supply pack structure in which a case housing an electricity storage portion has an opening formed therein for inserting and removing a plug which interrupts charge and discharge currents of the electricity storage portion.

BACKGROUND ART

With regard to the conventional power supply pack structure, for example, Japanese Patent Laying-Open No. 2002-175791 discloses an interlock device for a secondary battery which aims at ensuring improved safety for operators and securing reliability of the relock operation by the operators. The interlock device disclosed in this document is provided in a case which houses a secondary battery and an apparatus for controlling the secondary battery.

The interlock device includes a safety plug which is attached to the case's lid for the secondary battery and a lock mechanism which locks the case's lid for the apparatus for control. The safety plug attached to the case's lid for the secondary battery allows the electric power of the secondary battery to be received. When the safety plug is removed, receipt of the electric power of the secondary battery is interrupted. The safety plug which is removed from the case's lid for the secondary battery is attached to the lock mechanism, to thereby unlock the lock mechanism and inhibit the disconnection of the plug from the lock mechanism. This configuration allows the operators to open the case's lid for the apparatus for control only in the state in which receipt of the electric power of the secondary battery is interrupted.

In contrast to the above-described battery pack structure, a service plug which permits and interrupts the receipt of the electric power of the secondary battery may be housed in the case, and an opening for accessing the service plug may be formed in the case. In this instance, when the secondary battery is required to be replaced during maintenance, the battery pack housing only the secondary battery is transported since the existing apparatus can be continued to be used. During the transportation, however, even if the case is configured not to open, there are possibilities that the cable of the secondary battery through which charge and discharge currents flow may be taken out from the opening and the terminal on the cable may be accidentally touched.

DISCLOSURE OF THE INVENTION

An object of the present invention is to solve the above-described problems and to provide a power supply pack structure which prevents the cable from being accidentally touched.

A power supply pack structure according to one aspect of the present invention includes an electricity storage portion having a positive terminal and a negative terminal, a case housing the electricity storage portion, a positive cable having both ends connected to the positive terminal and an apparatus, respectively, a discharge current from the electricity storage portion flowing through the positive cable, and a negative cable having both ends connected to the negative terminal and the apparatus, respectively, a charge current flowing through the negative cable toward the electricity storage portion. The case has an opening formed therein for accessing the apparatus which is arranged adjacent to the electricity storage portion and electrically connected to the electricity storage portion. In the state where the apparatus is not disposed in the case, at least one of a condition that the positive cable has its length shorter than the shortest distance between the positive terminal and the opening and a condition that the negative cable has its length shorter than the shortest distance between the negative terminal and the opening is satisfied.

According to the power supply pack structure configured in this way, in the state where the apparatus is not disposed in the case and only the electricity storage portion is housed in the case, the positive cable and the negative cable are both not taken out from the case through the opening. Consequently, both the positive cable and the negative cable can be prevented from being accidentally touched from outside the case.

A power supply pack structure according to another aspect of the present invention includes an electricity storage portion having a positive terminal and a negative terminal, a case housing the electricity storage portion, a positive cable having one end and the other end connected to the positive terminal and an apparatus, respectively, a discharge current from the electricity storage portion flowing through the positive cable, and a negative cable having one end and the other end connected to the negative terminal and the apparatus, respectively, a charge current flowing through the negative cable toward the electricity storage portion. The case has an opening formed therein for accessing the apparatus which is arranged adjacent to the electricity storage portion and electrically connected to the electricity storage portion. The positive cable and the negative cable have, between the one ends and the other ends, respectively, a first fixed portion and a second fixed portion fixed at a predetermined position within the case. In the state where the apparatus is not disposed in the case, at least one of a condition that the positive cable from the first fixed portion to the other end has its length shorter than the shortest distance between the predetermined position and the opening and a condition that the negative cable from the second fixed portion to the other end has its length shorter than the shortest distance between the predetermined position and the opening is satisfied.

According to the power supply pack structure configured in this way, in the state where the apparatus is not disposed in the case and only the electricity storage portion is housed in the case, the positive cable and the negative cable are both not taken out through the opening. Consequently, both the positive cable and the negative cable can be prevented from being accidentally touched from outside the case. Furthermore, the positive cable and the negative cable may be sagged between the one end and the first fixed portion and between the one end and the second fixed portion, respectively, to thereby allow the positive cable and the negative cable to have sufficient lengths relative to the distances from the positive terminal and the negative terminal to the apparatus, respectively. Thus, the workability can be improved when the apparatus is installed within the case and respective other ends of the positive and negative cables are connected to the apparatus.

In addition, the electricity storage portion further includes a plate member sandwiching and holding stacked power supply cells together. Preferably, the first and second fixed portions are fixed to the plate member. According to the power supply pack structure configured in this way, the positive cable and the negative cable are fixed only to the electricity storage portion. Therefore, an excessive force can be prevented from being exerted on the positive cable and the negative cable even if the electricity storage portion moves within the case.

The apparatus has a current interrupting portion interrupting flow of the charge and discharge currents of the electricity storage portion. Preferably, the opening opens in a position where the current interrupting portion can be accessed from outside the case. According to the power supply pack structure configured in this way, the power supply pack in which the current interrupting portion is operated through the opening from outside the case can provide any of the above-described effects.

Furthermore, the case has a direction of a longer dimension along the direction in which the electricity storage portion and the apparatus are adjacent to each other, and a direction of a shorter dimension orthogonal to the direction of the longer dimension. Preferably, the opening is formed on one end in the direction of the shorter dimension of the case. The apparatus has a terminal portion to which the positive cable and the negative cable are connected and which is provided on the other end in the direction of the shorter dimension of the case. At least one of the positive terminal and the negative terminal is provided on the other end in the direction of the shorter dimension of the case.

It is to be noted that "formed on one end" means being formed at a position closer to the one end than the other end, and "provided on the other end" means being provided at a position closer to the other end than the one end.

According to the power supply pack structure configured in this way, the terminal portion and at least one of the positive terminal and the negative terminal are provided on the same side in the direction of the shorter dimension of the case, and the opening is formed on the opposite side thereof. Thus, at least one of the lengths of the positive cable and the negative cable can be readily set so as to reach the terminal portion of the apparatus but not reach the opening.

Furthermore, the electricity storage portion is a lithium-ion battery. According to the power supply pack structure configured in this way, the power supply pack housing a lithium-ion battery can provide any of the above-described effects.

As described above, according to the present invention, a power supply pack structure can be provided that prevents the cable from being accidentally touched.

BEST MODES FOR CARRYING OUT THE INVENTION

The embodiments of the present invention will be described with reference to the accompanying drawings, in which the same or corresponding components are designated by the same reference numerals.

First Embodiment

Figure 1:
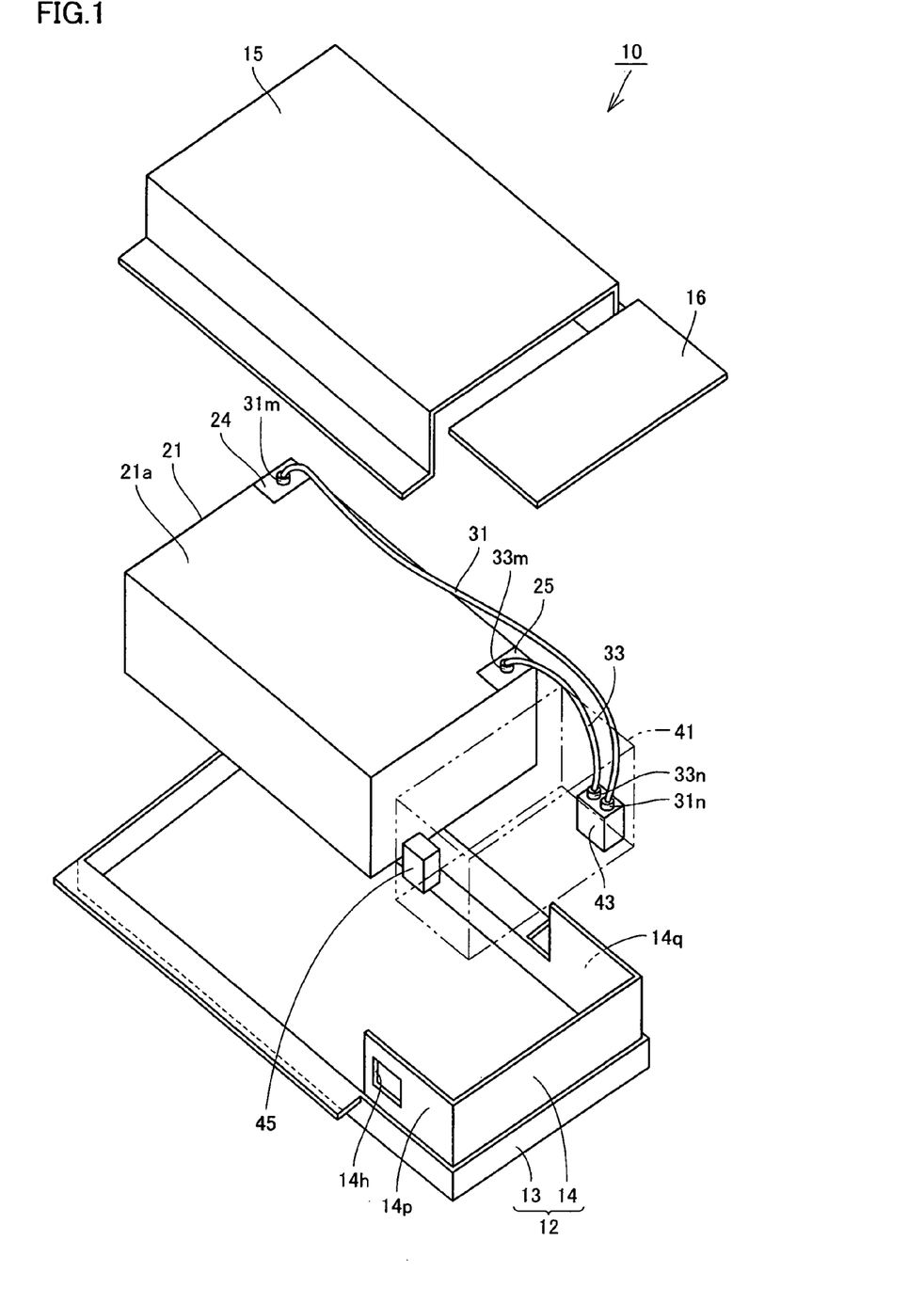
FIG. 1 is an exploded assembly view of a battery pack structure in a first embodiment of the present invention.
Figure 2:
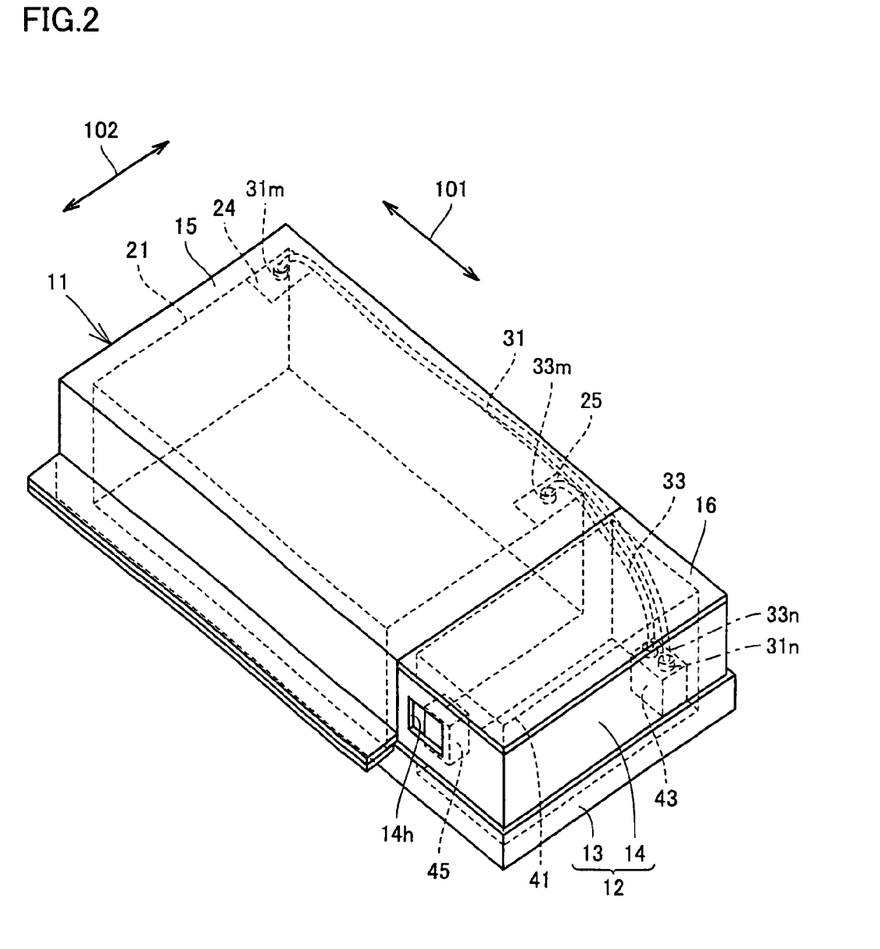
FIG. 2 is a diagram of a completed battery pack shown in FIG. 1.

FIG. 1 is an exploded assembly view of a battery pack structure in a first embodiment of the present invention. FIG. 2 is a diagram of a completed battery pack shown in FIG. 1.

The battery pack shown in the drawings is installed in a hybrid vehicle which employs, as a power source, an internal combustion engine such as a gasoline engine and a diesel engine, and a chargeable and dischargeable secondary battery.

Referring to FIGS. 1 and 2, battery pack 10 in the present embodiment houses a battery set 21 including a lithium-ion battery and an apparatus 41 electrically connected to battery set 21. Battery set 21 is substantially rectangular parallelepiped in outer shape. Battery set 21 has a configuration in which a plurality of battery cells are electrically connected in series to each other. Each battery cell is comprised of a positive sheet and a negative sheet which are stacked with a separator interposed therebetween, and a laminated outer sheath body which houses the positive and negative sheets wound into a roll.

The positive sheet and the negative sheet have surfaces to which pastes including a positive active material and a negative active material are applied, respectively. As a positive active material, one type or two or more types of the positive active material used in a lithium-ion battery such as $LiMn_2O_4$, $LiCoO_2$, $LiNiO_3$ can be used without being limited to particular one or ones. As a negative active material, one type or two or more types of the negative active material used in a lithium-ion battery such as amorphous carbon and graphite carbon can be used without being limited to particular one or ones. An organic electrolyte produced by dissolving a lithium salt in an organic solvent is impregnated in the positive sheet and the negative sheet.

In addition to a service plug 45 interrupting a high-voltage circuit during inspection and maintenance of battery pack 10, and a terminal portion 43 where the charge and discharge currents of battery set 21 flow in and out, apparatus 41 includes a plurality of apparatuses such as a battery computer, a relay which controls the high-voltage circuit of battery set 21, and various kinds of sensors which detect the total voltage and the charge and discharge currents of battery set 21.

Battery pack 10 includes a battery case 11 having a lower case 12, and an upper case 15 and an apparatus cover 16 which are attached to lower case 12. Battery case 11 is formed of, for example, metal such as a galvanized steel plate and is in the shape of a substantially rectangular parallelepiped housing. Battery case 11, as seen from above, has a direction of a longer dimension (direction shown by an arrow 101 in FIG. 2) and a direction of a shorter dimension (direction shown by an arrow 102 in FIG. 2).

Lower case 12 includes a bottom portion 13 which extends in a substantially rectangular shape and is bent at outer edges thereof, and an apparatus case portion 14 which is vertically provided on bottom portion 13. Apparatus case portion 14 is fixed to bottom portion 13, for example, by welding. Apparatus case portion 14 extends along the periphery of bottom portion 13 in the range along one side of bottom portion 13 in the direction of the shorter dimension of battery case 11 and along parts of two sides of bottom portion 13 which are located on both ends of the one side and which extend in the direction of the longer dimension of battery case 11. In this configuration, apparatus case portion 14 has side surfaces 14$p$ and 14$q$ which are spaced apart from and opposed to each other in the direction of the shorter dimension of battery case 11.

Battery set 21 and apparatus 41 are arranged on lower case 12 which are adjacent to each other in the direction of the longer dimension of battery case 11. Apparatus 41 is disposed in a position where it is surrounded on three sides by apparatus case portion 14. Battery set 21 is disposed in a position where it does not overlap with the position surrounded by apparatus case portion 14.

Upper case 15 is attached to bottom portion 13 so as to cover battery set 21. Upper case 15 is fixed to bottom portion 13, for example, using a bolt having a part which is engaged with a spanner, the part being detached when fastening is carried out at a torque of a certain amount or more. This bolt is used to provide such a structure that prevents upper case 15 once fixed to bottom portion 13 from being removed from lower case 12.

Apparatus cover 16 is attached to apparatus case portion 14 so as to cover apparatus 41. Apparatus cover 16 is fixed to apparatus case portion 14, for example, using a bolt which can be rotated only by a special service tool. This service tool is carried by the operator who performs inspection and maintenance of battery pack 10, and is structured to prevent apparatus cover 16 from being removed by ordinary users.

Battery set 21 which is housed in battery case 11 is surrounded by bottom portion 13 of lower case 12, upper case 15 and apparatus 41. Apparatus 41 is surrounded by bottom portion 13 and apparatus case portion 14 of lower case 12, apparatus cover 16, and battery set 21.

Service plug 45 and terminal portion 43 which are components of apparatus 41 are disposed at respective positions facing side surfaces 14$p$ and 14$q$ of apparatus case portion 14, respectively. In other words, service plug 45 and terminal portion 43 are disposed on the opposite sides in the direction of the shorter dimension of battery case 11. Side surface 14$p$ has an opening 14$h$ formed therein for accessing service plug 45. During inspection and maintenance of battery pack 10, the operator removes and inserts the grip provided in service plug 45 through opening 14$h$ from outside battery case 11, to interrupt and recover the high-voltage circuit of battery set 21.

Battery set 21 is provided with a positive terminal 24 from which the discharge current flows out and a negative terminal 25 into which the charge current flows. Positive terminal 24 and negative terminal 25 are disposed at both ends of battery set 21 in the direction of the longer dimension of battery case 11. Positive terminal 24 and negative terminal 25 are disposed in a top surface 21$a$ of battery set 21 which faces upper case 15, on the side opposite to bottom portion 13.

Positive terminal 24 and negative terminal 25 are disposed on the side which is opposite to opening 14$h$ and on which terminal portion 43 is disposed in apparatus 41, in the direction of the shorter dimension of battery case 11. In other words, terminal portion 43, positive terminal 24 and negative terminal 25 are disposed in the positions closer to side surface 14$q$ which is distant from opening 14$h$ in the direction of the shorter dimension of battery case 11 than side surface 14$p$ in which opening 14$h$ is formed.

Battery pack 10 further houses a total positive cable 31 which extends between positive terminal 24 and terminal portion 43, and a total negative cable 33 which extends between negative terminal 25 and terminal portion 43. Total positive cable 31 has one end 31$m$ which is connected to positive terminal 24 and the other end 31$n$ which is connected to terminal portion 43. Total negative cable 33 has one end 33$m$ which is connected to negative terminal 25 and the other end 33$n$ which is connected to terminal portion 43. In the state in which battery set 21 and apparatus 41 are housed in battery case 11, total positive cable 31 has its length greater than the shortest distance between positive terminal 24 and terminal portion 43, and total negative cable 33 has its length greater than the shortest distance between negative terminal 25 and terminal portion 43.

Figure 3:
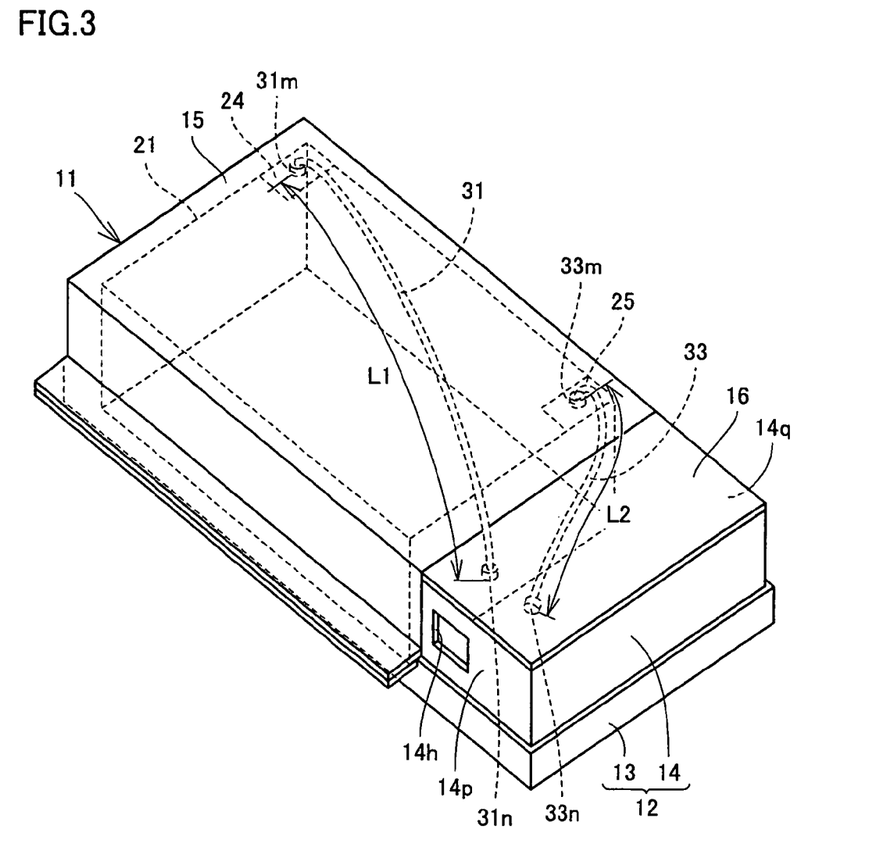
FIG. 3 is a perspective view showing the state during the transportation of the battery pack in FIG. 2.

FIG. 3 is a perspective view showing the state during the transportation of the battery pack in FIG. 2. Referring to FIG. 3, battery set 21 installed in a vehicle is sometimes replaced by a new one due to exhaustion, failure and the like. In this instance, since apparatus 41 can be continued to be used without replacement, battery pack 10 which houses only battery set 21 is required to be transported as a part to be replaced to a repair shop and the like. At this time, total positive cable 31 and total negative cable 33 have one ends 31$m$ and 33$m$ connected to positive terminal 24 and negative terminal 25, respectively, and have the other ends 31$n$ and 33$n$ housed in battery case 11.

In the present embodiment, in the state in which only battery set 21 is housed in battery case 11, a length L1 of total positive cable 31 is shorter than the shortest distance between positive terminal 24 and opening 14$h$, and a length L2 of total negative cable 33 is shorter than the shortest distance between negative terminal 25 and opening 14$h$. This configuration prevents total positive cable 31 and total negative cable 33 from being taken out from opening 14$h$ during transportation of battery pack 10.

Furthermore, in the present embodiment, positive terminal 24 and negative terminal 25 are disposed on the side which is opposite to opening 14$h$ and on which terminal portion 43 is disposed in apparatus 41, in the direction of the shorter dimension of battery case 11. Thus, the lengths of total positive cable 31 and total negative cable 33 can be readily set to lengths L1 and L2, respectively, so as to reach terminal portion 43 but not reach opening 14$h$.

The battery pack structure in the first embodiment of the present invention includes battery set 21 as an electricity storage portion having positive terminal 24 and negative terminal 25, battery case 11 as a case housing battery set 21, total positive cable 31 which has both ends connected to positive terminal 24 and apparatus 41, respectively, and through which the discharge current from battery set 21 flows, and total negative cable 33 which has both ends connected to negative terminal 25 and apparatus 41, respectively, and through which the charge current flows toward battery set 21. Battery case 11 has opening 14$h$ formed therein for accessing apparatus 41 which is disposed adjacent to battery set 21 and electrically connected to battery set 21. In the state where apparatus 41 is not disposed in battery case 11, at least one of the condition that length L1 of total positive cable 31 is shorter than the shortest distance between positive terminal 24 and opening 14$h$ and the condition that length L2 of total negative cable 33 is shorter than the shortest distance between negative terminal 25 and opening 14$h$ is satisfied.

According to the battery pack structure in the first embodiment of the present invention configured in this way, total positive cable 31 and total negative cable 33 can be prevented from being accidentally touched through opening 14$h$ from outside battery case 11 during transportation of battery pack 10. This allows the safety of handling of battery pack 10 during the transportation to be improved.

In the present embodiment, although both of total positive cable 31 and total negative cable 33 are structured so as not to be taken out from opening 14$h$, the present invention is not limited to this, and any one of total positive cable 31 and total negative cable 33 may be structured so as not to be taken out from opening 14$h$. Battery set 21 is also not limited to a lithium-ion battery and may be, for example, a nickel-hydride battery.

Furthermore, the vehicle equipped with battery pack 10 is not limited to a hybrid vehicle which uses an internal combustion engine and a secondary battery as a power source, and may be, for example, a fuel cell hybrid vehicle (FCHV) which uses a fuel cell and a secondary battery as a power source and an electric vehicle (EV). In the hybrid vehicle in the present embodiment, the internal combustion engine is driven at an operating point of optimal fuel efficiency, whereas in the fuel cell hybrid vehicle, the fuel cell is driven at an operating point of optimal electric power generation efficiency. The secondary battery is used basically in the same manner in both of the hybrid vehicles.

Also in the present embodiment, although the power supply pack structure in the present invention is applied to the battery pack housing the battery which generates electricity by itself by chemical change and the like, the present invention is not limited to this, and the power supply pack structure in the present invention may be applied to an electricity storage device such as a capacitor which stores electricity as externally supplied.

A capacitor is an electric double layer capacitor which uses, as an operating mechanism, an electric double layer generated at the interface between activated carbon and an electrolytic solution. When the activated carbon as a solid and the electrolytic solution (dilute sulfuric acid solution) as a liquid are brought into contact with each other, positive and negative electrodes are relatively distributed at the interface therebetween at a very small distance from each other. When a pair of electrodes are immersed in an ionic solution to apply voltage thereto to the extent that electrolysis does not occur, ions are adsorbed on the surface of each electrode to store positive electricity and negative electricity (charge). When electricity is released to the outside, positive and negative ions are separated from the electrodes and return to a neutral state (discharge).

Second Embodiment

Figure 4:
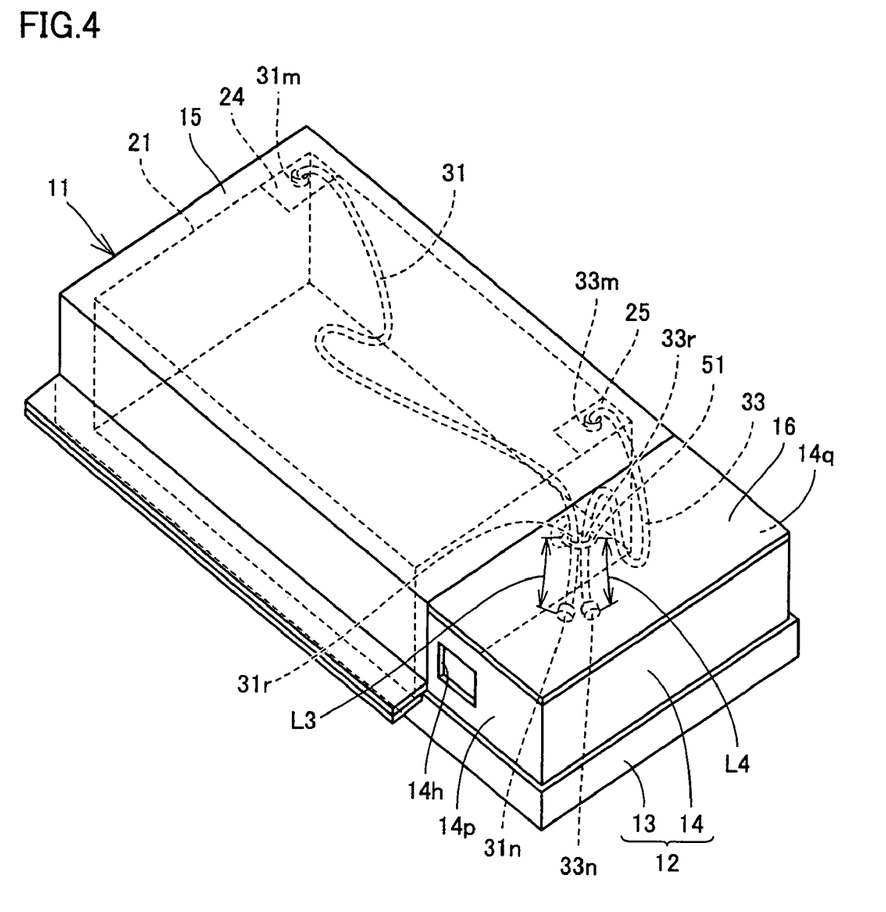
FIG. 4 is a perspective view showing a battery pack structure in a second embodiment of the present invention.

FIG. 4 is a perspective view showing a battery pack structure in a second embodiment of the present invention and corresponds to FIG. 3 in the first embodiment. The battery pack structure in the present embodiment has a structure basically similar to the battery pack structure in the first embodiment. Description of the same components will not hereinafter be repeated.

Referring to FIG. 4, in the present embodiment, a fixed portion 31r of total positive cable 31 between one end 31m and the other end 3 in and a fixed portion 33r of total negative cable 33 between one end 33m and the other end 33n are fixed by a wiring holder 51 to battery set 21.

A length L3 of total positive cable 31 from fixed portion 31r to the other end 31n is shorter than the shortest distance between the position at which wiring holder 51 is disposed and opening 14h. A length L4 of total negative cable 33 from fixed portion 33r to the other end 33n is shorter than the shortest distance between the position at which wiring holder 51 is disposed and opening 14h. The entire length of total positive cable 31 may be greater than the shortest distance between positive terminal 24 and opening 14h. The entire length of total negative cable 33 may be greater than the shortest distance between negative terminal 25 and opening 14h.

Figure 5:
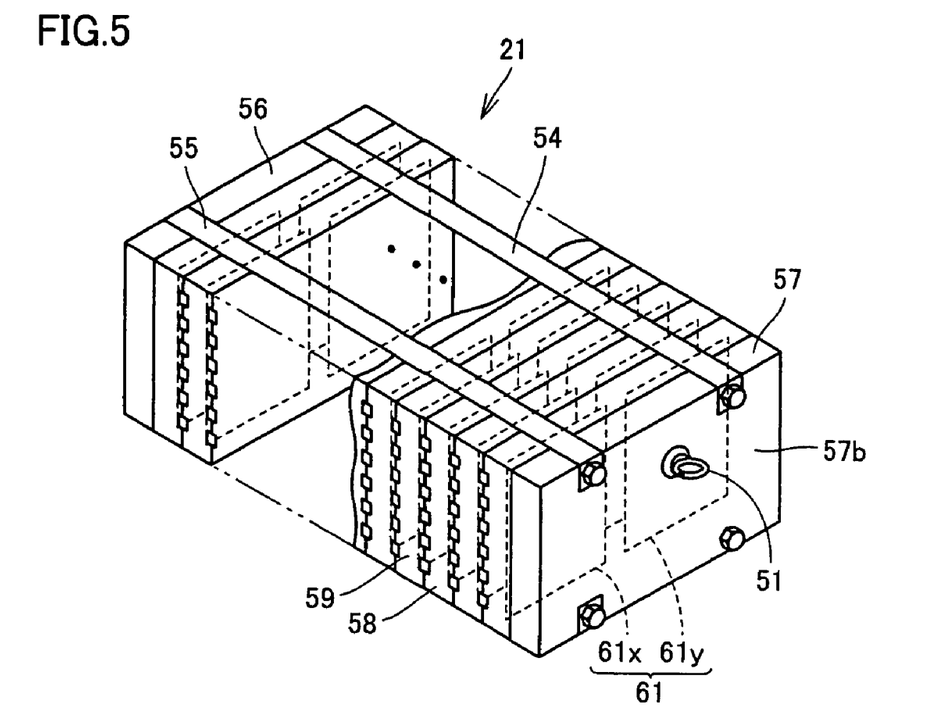
FIG. 5 is a perspective view showing in detail a battery set housed in a battery pack in FIG. 4.

FIG. 5 is a perspective view showing in detail the battery set housed in the battery pack in FIG. 4. Referring to FIG. 5, battery set 21 includes a plurality of battery cells 61, and, in the present embodiment, has a structure in which sets of battery cells 61x and 61y arranged in parallel are stacked in one direction.

The sets of battery cells 61x and 61y are held by a resin frame 58 formed of a resin material such as polypropylene, for example. Resin frame 58 has a cooling air passage 59 formed therein through which the cooling air flows between battery cells 61 in the direction in which they are stacked. A plurality of resin frames 58 holding battery cells 61x and 61y are arranged in the direction in which battery cells 61 are stacked. Disposed on both ends of the plurality of arranged resin frames 58 are end plates 56 and 57 as a plate member. End plates 56 and 57 which hold the plurality of resin frames 58 therebetween are coupled to each other by a restraining band 54.

End plate 57 is disposed in the position adjacent to apparatus 41 and has a side surface 57b which faces apparatus 41. Wiring holder 51 is fixed to side surface 57b. This configuration allows total positive cable 31 and total negative cable 33 to be fixed only to battery set 21 during transportation of the battery pack. Consequently, excessive tensile force and the like can be prevented from being applied to total positive cable 31 and total negative cable 33 even if battery set 21 may move within battery case 11 due to, for example, shaking during transportation.

The battery pack structure in the second embodiment of the present invention includes battery set 21 having positive terminal 24 and negative terminal 25, battery case 11 housing battery set 21, total positive cable 31 which has one end 31m and the other end 3 in connected to positive terminal 24 and apparatus 41, respectively, and through which the discharge current from battery set 21 flows, and total negative cable 33 which has one end 33m and the other end 33n connected to negative terminal 25 and apparatus 41, respectively, and through which the charge current flows toward battery set 21.

Battery case 11 has opening 14h formed therein for accessing apparatus 41 which is arranged adjacent to battery set 21 and electrically connected to battery set 21. Total positive cable 31 and total negative cable 33 have, between one end 31m and the other end 33n and between one end 33m and the other end 33n, respectively, fixed portion 31r as a first fixed portion and fixed portion 33r as a second fixed portion fixed at a predetermined position within battery case 11. In the state where apparatus 41 is not disposed in battery case 11, at least one of the condition that length L3 of total positive cable 31 from fixed portion 31r to the other end 31n is shorter than the shortest distance between the predetermined position and opening 14h and the condition that length L4 of total negative cable 33 from fixed portion 33r to the other end 33n is shorter than the shortest distance between the predetermined position and opening 14h is satisfied.

According to the battery pack structure in the second embodiment of the present invention configured in this way, the effect similar to that described in the first embodiment can be obtained. In addition, in the present embodiment, the positions of fixed portions 31r and 33r are set appropriately irrespective of the entire lengths of total positive cable 31 and total negative cable 33, which can readily provide such a structure that prevents total positive cable 31 and total negative cable 33 from being taken out from opening 14h. This allows total positive cable 31 and total negative cable 33 to have sufficient lengths relative to the distances from positive terminal 24 and negative terminal 25 to terminal portion 43, respectively. Therefore, the workability of connecting total positive cable 31 and total negative cable 33 to terminal portion 43 can be improved.

It is to be noted that the positions where fixed portions 31r and 33r are fixed are not limited to battery set 21, and may be, for example, upper case 15 and apparatus cover 16, and also may be a junction box equipped with a relay and various types of sensors as apparatus 41. Furthermore, fixed portion 31r and fixed portion 33r may be fixed to different positions.

The present embodiment, as in the first embodiment, may also be structured to prevent any one of total positive cable 31 and total negative cable 33 from being taken out from opening 14h.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The present invention is mainly applied to a power supply pack structure which is installed in a hybrid vehicle as a power source and which includes a lithium-ion battery.

The invention claimed is:

1. A power supply pack structure comprising:
an electricity storage portion having a positive terminal and a negative terminal;
a case housing said electricity storage portion and having an opening formed therein for accessing an apparatus arranged adjacent to said electricity storage portion and electrically connected to said electricity storage portion;
a positive cable having one end and an other end connected to said positive terminal and said apparatus, respectively, a discharge current from said electricity storage portion flowing through said positive cable; and
a negative cable having one end and an other end connected to said negative terminal and said apparatus, respectively, a charge current flowing through said negative cable toward said electricity storage portion, wherein
at least one of 1) said positive cable has a totally extended length that is shorter than a shortest distance between said positive terminal and said opening and 2) said negative cable has a totally extended length that is shorter than a shortest distance between said negative terminal and said opening, is satisfied.

2. The power supply pack structure according to claim 1, wherein
said apparatus has a current interrupting portion interrupting flow of the charge and discharge currents of said electricity storage portion, and
said opening opens in a position where said current interrupting portion can be accessed from outside said case.

3. The power supply pack structure according to claim 1, wherein
said case has a direction of a longer dimension along a direction in which said electricity storage portion and said apparatus are adjacent to each other and along a long side of said case having a first length, and a direction of a shorter dimension orthogonal to said direction of the longer dimension and along a short side of said case having a second length shorter than said first length,
said opening is formed on one end in said direction of the shorter dimension of said case,
said apparatus has a terminal portion to which said positive cable and said negative cable are connected and which is provided on the other end in said direction of the shorter dimension of said case, and
at least one of said positive terminal and said negative terminal is provided on the other end in said direction of the shorter dimension of said case.

4. The power supply pack structure according to claim 1, wherein said electricity storage portion is a lithium-ion battery.

5. A power supply pack structure comprising:
an electricity storage portion having a positive terminal and a negative terminal;
a case housing said electricity storage portion and having an opening formed therein for accessing an apparatus which is arranged adjacent to said electricity storage portion and electrically connected to said electricity storage portion;
a positive cable having one end and an other end connected to said positive terminal and said apparatus, respectively, a discharge current from said electricity storage portion flowing through said positive cable; and
a negative cable having one end and an other end connected to said negative terminal and said apparatus, respectively, a charge current flowing through said negative cable toward said electricity storage portion, wherein
said positive cable and said negative cable have, between said one ends and said other ends, respectively, a first fixed portion and a second fixed portion fixed at a predetermined position within said case and
at least one of 1) said positive cable from said first fixed portion to said other end has a totally extended length that is shorter than a shortest distance between said predetermined position and said opening and 2) said negative cable from said second fixed portion to said other end has a totally extended length that is shorter than the shortest distance between said predetermined position and said opening, is satisfied.

6. The power supply pack structure according to claim 5, wherein
said electricity storage portion further includes a plate member sandwiching and holding stacked power supply cells together, and
said first and second fixed portions are fixed to said plate member.

7. The power supply pack structure according to claim 5, wherein
said apparatus has a current interrupting portion interrupting flow of the charge and discharge currents of said electricity storage portion, and
said opening opens in a position where said current interrupting portion can be accessed from outside said case.

8. The power supply pack structure according to claim 5, wherein
said case has a direction of a longer dimension along a direction in which said electricity storage portion and said apparatus are adjacent to each other, and a direction of a shorter dimension orthogonal to said direction of the longer dimension,
said opening is formed on one end in said direction of the shorter dimension of said case,
said apparatus has a terminal portion to which said positive cable and said negative cable are connected and which is provided on the other end in said direction of the shorter dimension of said case, and
at least one of said positive terminal and said negative terminal is provided on the other end in said direction of the shorter dimension of said case.

9. The power supply pack structure according to claim 5, wherein said electricity storage portion is a lithium-ion battery.

* * * * *